(12) United States Patent
Bowers et al.

(10) Patent No.: US 11,097,829 B2
(45) Date of Patent: Aug. 24, 2021

(54) METHODS AND APPARATUS TO CONTROL CAMBER

(71) Applicant: The Boeing Company, Chicago, IL (US)

(72) Inventors: Bret Alan Bowers, Mukilteo, WA (US); Kevin Tsai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 804 days.

(21) Appl. No.: 15/953,018

(22) Filed: Apr. 13, 2018

(65) Prior Publication Data
US 2019/0315449 A1    Oct. 17, 2019

(51) Int. Cl.
*B64C 3/50* (2006.01)
*B64C 13/16* (2006.01)

(52) U.S. Cl.
CPC ............... *B64C 3/50* (2013.01); *B64C 13/16* (2013.01)

(58) Field of Classification Search
CPC .................................. B64C 3/50; B64C 13/16
See application file for complete search history.

(56) References Cited

U.S. PATENT DOCUMENTS

| | | | | |
|---|---|---|---|---|
| 8,684,316 B2* | 4/2014 | Sakurai | ..................... | B64C 9/16 244/216 |
| 8,763,953 B2 | 7/2014 | Sakurai et al. | | |
| 9,193,440 B2* | 11/2015 | Moser | ....................... | B64C 9/06 |
| 9,731,812 B2* | 8/2017 | Walker | ...................... | B64C 9/16 |
| 2009/0302168 A1* | 12/2009 | Hetrick | ..................... | B64C 3/52 244/214 |
| 2013/0087662 A1* | 4/2013 | Soenarjo | ................... | B64C 3/50 244/215 |
| 2015/0083867 A1* | 3/2015 | Moser | ...................... | B64C 9/24 244/214 |
| 2015/0088340 A1* | 3/2015 | Moser | ...................... | B64C 9/16 701/3 |
| 2019/0031317 A1* | 1/2019 | Tsai | ......................... | B64C 7/00 |
| 2020/0130812 A1* | 4/2020 | Tsai | ......................... | B64C 9/18 |

* cited by examiner

*Primary Examiner* — Valentina Xavier
(74) *Attorney, Agent, or Firm* — Hanley, Flight & Zimmerman, LLC

(57) ABSTRACT

Methods and apparatus to control camber are disclosed. A disclosed example apparatus includes a flap support to be coupled to a flap of an aircraft, where the flap is rotatable relative to an aerodynamic surface, a drive arm linkage rotatably coupled to the flap support at a first pivot of the flap support, where the drive arm linkage includes a second pivot at an end opposite the first end, and a flap support actuator operatively coupled to the flap support, where the flap support actuator is to rotate the drive arm linkage. The example apparatus also includes a camber control actuator rotatably coupled to the flap support at a third pivot of the flap support, where the camber control actuator is to be rotatably coupled to the flap at a fourth pivot.

20 Claims, 8 Drawing Sheets

METHODS AND APPARATUS TO CONTROL CAMBER

FIELD OF THE DISCLOSURE

This disclosure relates generally to aircraft and, more particularly, to methods and apparatus to control camber.

BACKGROUND

Aircraft performance during a cruise flight stage can vary greatly based on trailing edge camber of a wing. In particular, small changes in trailing edge camber of the wing can greatly affect overall aircraft performance by affecting aerodynamic properties of the wing (e.g., affecting drag and lift coefficients of the wing). To adjust for these effects on the aerodynamic properties, trailing edge variable camber (TEVC) systems are implemented to adjust camber associated with a high lift device, such as a flap associated with the wing, to improve overall aircraft performance.

Flaps that move in a fowler motion (e.g., high fowler or low fowler flaps) are sometimes implemented in known TEVC systems. However, these flaps can be displaced during flight (e.g., during a cruise flight stage of the aircraft) to adjust a camber of the wing (e.g., based on flap kinematics or motion), thereby resulting in an undesirable gap or relative orientation between the flap and the wing during TEVC adjustment. As a result, overall aircraft parameters, such as fuel efficiency and/or drag coefficient, can be negatively impacted.

SUMMARY

An example apparatus includes a flap support to be coupled to a flap of an aircraft, where the flap is rotatable relative to an aerodynamic surface, a drive arm linkage rotatably coupled to the flap support at a first pivot of the flap support, where the drive arm linkage has a second pivot at an end opposite the first end, and a flap support actuator operatively coupled to the flap support, and where the flap support actuator is to rotate the drive arm linkage. The example apparatus also includes a camber control actuator rotatably coupled to the flap support at a third pivot of the flap support, where the camber control actuator is to be rotatably coupled to the flap at a fourth pivot.

An example method includes rotating, via a flap support actuator, a main drive linkage to move a flap of an aircraft relative to a neutral position associated with an aerodynamic surface, where the main drive linkage is rotatably coupled to a flap support at a first pivot of the flap support, and where the main drive linkage includes a second pivot at an end opposite the first pivot. The example method also includes moving, via a camber control actuator, the flap to adjust an angle of the flap, where the camber control actuator is rotatably coupled to a third pivot of the flap support and a fourth pivot associated with the flap.

An example tangible machine readable medium includes instructions, which when executed, cause a processor to at least determine that a flap of an aircraft has been rotated, via a flap support actuator, relative to a neutral position associated with an aerodynamic surface, where the flap support actuator moves a drive arm linkage that is rotatably coupled to a flap support at a first pivot of the flap support, and where the main drive linkage includes a second pivot at an end opposite the first pivot. The processor is further caused to determine a flight parameter of the aircraft during a cruise flight stage of the aircraft and calculate an adjustment flap angle based on the flight parameter. The processor is further caused to control movement of a camber control actuator based on the adjustment flap angle to adjust an angle of the flap, where the camber control actuator is rotatably coupled to a third pivot of the flap support and a fourth pivot associated with the flap.

Figure 1:
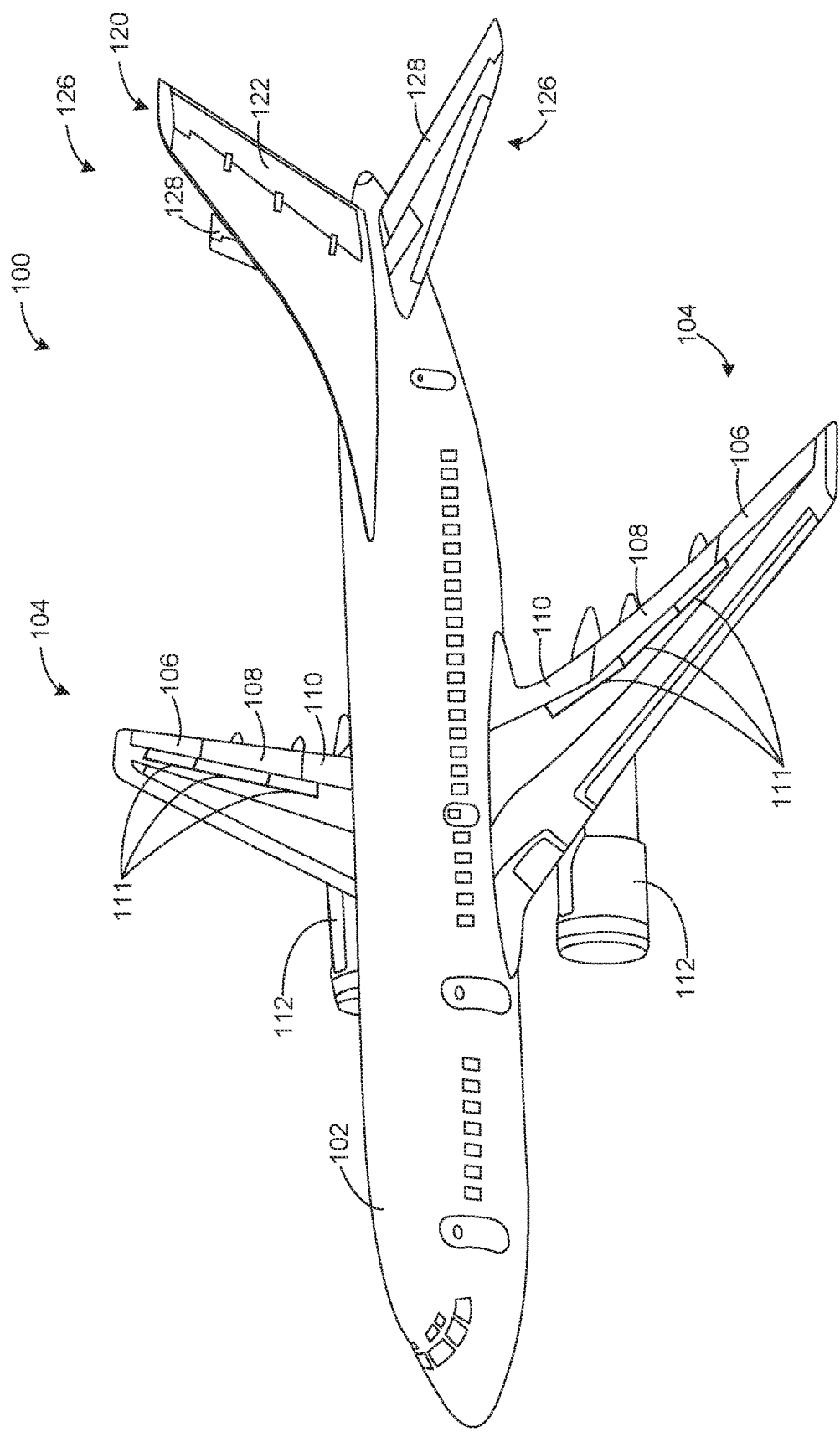
FIG. 1 is an aircraft in which the examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Methods and apparatus to control camber are disclosed. Known trailing edge variable camber (TEVC) systems control a position of a flap during cruise of an aircraft for aerodynamic benefits. For example, maintaining a position of a flap relative to an aerodynamic surface, such as a wing surface, can reduce a drag coefficient based on a kinematic motion of known TEVC systems, thereby reducing overall fuel consumption. Further, sometimes fowler flaps, such as high fowler flaps for example, utilize a large amount of lateral movement during TEVC adjustment that can result in movement away from a flap seal during flight, thereby causing an increase in drag coefficient and, thus, lower overall fuel efficiency. In particular, the aforementioned high fowler flaps can have a 50% or greater fowler setting (e.g., 50% or greater of a fowler flap chord length is covered by a respective spoiler when the fowler flap is an undeployed position). In other words, TEVC control of fowler flaps can produce undesired movement of a flap from a respective aerodynamic structure.

Examples disclosed herein enable accurate control of a flap angle, thereby allowing effective TEVC control for aerodynamic advantages. In particular, examples disclosed herein can allow accurate flap control without deploying the flap, thereby reducing and/or eliminating aft motion of the flap (e.g., for high fowler flap applications). Examples disclosed herein can be implemented to maintain and/or adjust a position of a flap to lower an overall drag coefficient of an aircraft and/or maintain a seal with a respective flap seal to maintain desirable aerodynamic properties during flight.

Examples disclosed herein implement a flap support actuator operatively coupled to a flap support to rotate a flap via a drive arm linkage. Examples disclosed herein also implement a camber control actuator rotatably coupled to the flap support and the flap. In some examples disclosed herein, the flap is moved by the camber control actuator to adjust a camber of the flap when the flap support actuator moves the flap into a neutral position or orientation.

In some examples, the camber control actuator is implemented as a variable length actuator. In some examples, the camber control actuator moves the flap to engage a corresponding flap seal that is disposed between the flap and an aerodynamic structure, such as a wing for example. Additionally or alternatively, the camber control actuator adjusts the camber of the flap while the flap support actuator prevents rotational movement of the flap. In some examples, a flight metric (e.g., a flight parameter) is measured to calculate an adjustment flap angle and adjust the flap to the adjustment flap angle via the camber control actuator.

As used herein, the term "flap" refers to any aerodynamic component that is moved relative to an aerodynamic structure or body to achieve a desired aerodynamic effect, such as flight maneuvering or overall flight performance, etc. As used herein, the term "aerodynamic surface" refers to a surface that affects flight including flight maneuvering and/or flight cruise characteristics based on a relative movement of a moving fluid. As used herein, the term "neutral position" refers to a position or angular orientation in which a component is at a desired flight operation (e.g., a centered orientation during cruise, a zero-degree orientation, a relatively low drag coefficient position during cruise, etc.).

FIG. 1 is an aircraft 100 in which the examples disclosed herein may be implemented. The aircraft 100 includes a fuselage 102 and wings 104, which include ailerons 106, flaps 108, 110 and spoilers 111. The aircraft 100 also includes engines 112, a fin 120 with a rudder 122, and stabilizers 126 with elevators 128.

In operation, the aircraft 100 is maneuvered during flight by movement of at least one of the ailerons 106, the flaps 108, 110, the spoilers 111, the rudder 122 and the elevators 128 in conjunction with thrust provided by the engines 112. In particular, rotational motion or movement of the ailerons 106, the flaps 108, 110, the spoilers 111 the rudder 122 and/or the elevators 128 affects movement and/or orientation of the aircraft 100 during flight by causing airflow changes or gradients across the aircraft 100. During cruise of the aircraft 100, the ailerons 106, the flaps 108, 110, the spoilers 111, the rudder 122 and the elevators 128 are appropriately positioned to maintain a heading and overall aerodynamic performance of the aircraft 100.

Examples disclosed herein enable accurate camber control of aerodynamic components. In particular, examples disclosed herein can be applied to any of the ailerons 106, the flaps 108, 110, the spoilers 111, the rudder 122 and/or the elevators 128, or any other aerodynamic maneuvering structures to provide favorable flight operations (e.g., fuel savings due to drag coefficient reduction, more accurate control of movement of the aircraft 100, etc.).

Figure 2:
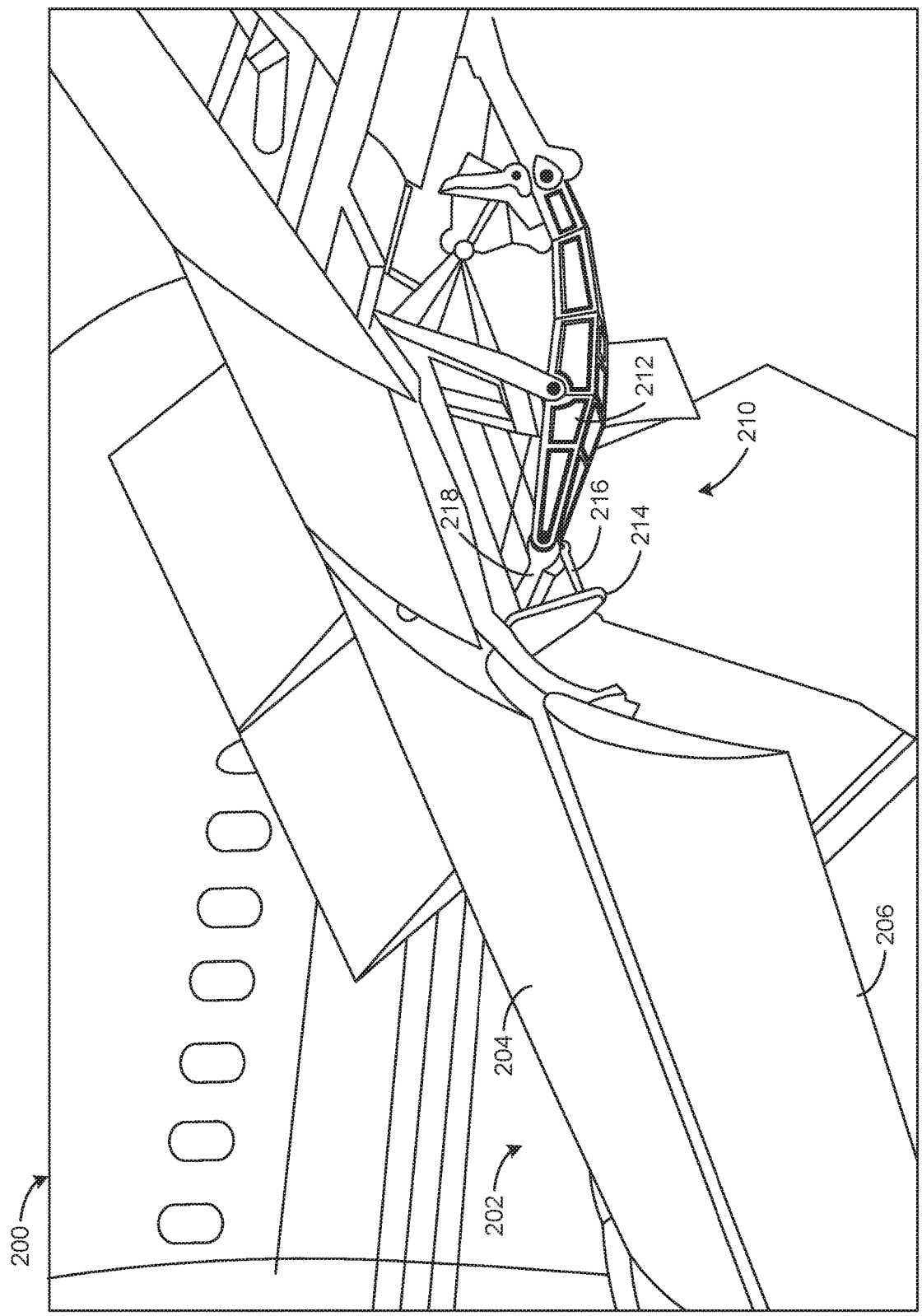
FIG. 2 illustrates a known flap assembly.

FIG. 2 illustrates a known flap assembly 200 to move a flap, such as a fowler flap. As can be seen in FIG. 2, wings 202 have an aerodynamic surface (e.g., a wing surface) 204, flaps 206 (some of which are removed for clarity) and a flap movement assembly 210. The flap movement assembly 210 includes a linkage 212, a coupling strut 214 and movable linkages 216, 218.

To rotate the flap 206 during flight maneuvering and/or to return the flap 206 to its neutral position, an actuator (not shown) rotates the linkage 212 which, in turn, causes movement of the linkages 216, 218 along with the coupling strut 214. In other words, the flap 206 is moved via a linkage mechanism (e.g., a four-bar linkage mechanism) including the coupling strut 214 and the linkages 212, 216, 218.

The flap 206 of FIG. 2 is a fowler flap (e.g., a high fowler flap) that moves through a relatively large rotational angle relative to the aerodynamic surface 204 during landing and/or take-off. Accordingly, the flap 206 has a tendency to move away and/or separate from the aerodynamic surface 204 (e.g., towards an aft direction of the aircraft 100) during cruise (e.g., when the aircraft 100 is in a cruise mode or cruise flight stage, etc.), thereby defining a gap therebetween. In contrast, examples disclosed herein prevent such a gap from forming. Further, examples disclosed herein enable accurate camber control adjustment of a flap during flight to enable precise maneuvering of an aircraft. Further, examples disclosed herein can be implemented and/or retrofit onto the linkage 218 that is already in service, for example.

Figure 3:
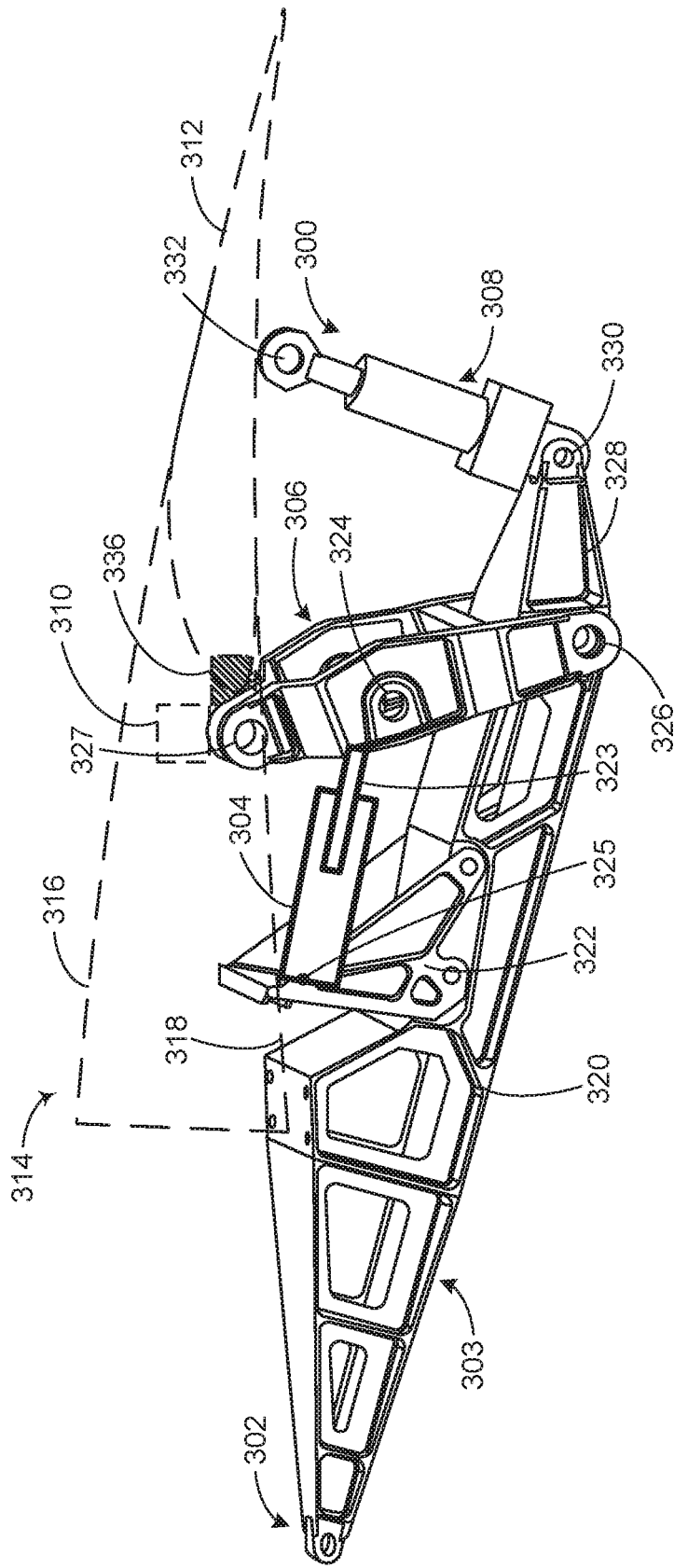
FIG. 3 is a side view of an example camber control system in accordance with the teachings of this disclosure.

FIG. 3 is a side view of an example camber control system 300 in accordance with the teachings of this disclosure. The camber control system 300 of the illustrated example includes a flap support 302 with a support body 303, a main drive actuator (e.g., a flap support actuator) 304, a drive arm linkage (e.g., a main drive linkage) 306, and a camber control actuator 308. In some examples, the camber control system 300 includes a sensor (e.g., an optical sensor, a positional sensor, a mechanical sensor, etc.) 310. According to the illustrated example, the camber control system 300 is operatively coupled to a flap (e.g., a fowler flap, a high fowler flap, a slotted flap, a junkers flap, or any other appropriate type of flap, etc.) 312 and a wing 314 defining upper and lower aerodynamic surfaces 316, 318, respectively. The camber control system 300 can be implemented on any To support the flap 312 at a desired angular position, the flap support 302 includes a structural member 320 of the support body 303. The structural member 320 has an actuator support member 322 coupled thereto. In turn, the actuator support member 322 supports and orients the main drive actuator 304 so that a movable portion (e.g., a piston, a movable member, an actuated member, etc.) 323 of the main drive actuator 304 can extend and retract therefrom. The movable portion 323 is coupled to the actuator support member 322 at a rigid connection point 325 and to the drive arm linkage 306 at a connection point (e.g., a pivot, a pivot connection point, etc.) 324.

To cause rotation of the flap 312, extension or retraction of the movable portion 323 toward or away from the main drive actuator 304 causes rotation of the drive arm linkage 306 about a first pivot (e.g., a wing-mounted pivot) 326 at a respective first end and about a second pivot 327 at a respective second end. Accordingly, a span (e.g., a linkage) 328 of the flap support 302 extends between the first pivot 326 and a third pivot 330. In operation, movement of the movable portion 323 rotates the camber control actuator 308 about the third pivot 330. Further, the camber control actuator 308 is rotatably coupled to the flap 312 at a fourth pivot 332.

To adjust a camber associated with the wing 314, the camber control actuator 308 adjusts a distance between the third and fourth pivots 330, 332. In particular, the camber control actuator 308 can be implemented as a variable length actuator (i.e., an adjustment length actuator) to vary a distance between the third and fourth pivots 330, 332. Additionally or alternatively, the camber control actuator 308 adjusts an angle of the flap 312 while the main drive actuator 304 restricts motion of the flap 312 from rotational and/or translational movement (e.g., during cruise of the aircraft 100). In other words, the main drive actuator can be restricted or locked to a general position (e.g., a rough estimate of a desired position or a neutral position) while the camber control actuator 308 accurately moves the flap 312 (e.g., moves the flap 312 to an accurate fine-tuned position of the flap 312). As a result, a center of pressure of the flap 312 in combination with the wing 314 is maintained relatively close to the respective center of gravity (e.g., an aggregate center of gravity), thereby reducing drag acting on the flap 312 and/or the wing 314 by redistributing wing loads.

In some examples, the camber control actuator 308 moves the flap 312 to engage a flap seal 336. In such examples, the camber control actuator 308 can translate and/or rotate the flap 312 to engage (e.g., sealingly engage) the flap seal 336. In particular, the camber control actuator 308 can cause movement of the flap 312 due to a relative position of the camber control actuator 308 relative to the flap 312 and the flap support 302. In some examples, a shape of the flap seal 336 in combination with a complementary shape of the flap 312 enables the flap seal 336 to seal against the flap 312 when the flap is translated and/or rotated towards the flap seal 336. Additionally or alternatively, the spoiler 111 is moved to engage the corresponding flap seal 336 against the flap 312.

In some examples, the fourth pivot 332 is disposed at approximately 25 to 75% (e.g., 30 to 60%) of a chord length of the flap 312. In some examples, the third pivot 330 is placed at a distal end of the span 328 and/or the flap support 302. In some examples, at least one of the camber control actuator 308 and/or the main drive actuator 304 is moved via electrical, hydraulic and/or mechanical drives. In some examples, at least one of the camber control actuator 308 and/or the main drive actuator 304 is implemented with a worm gear to reduce motion of the flap 312 relative to the wing 314. In other examples, planetary gears, or bevel gears are implemented. Additionally or alternatively, at least one of the camber control actuator 308 or the main drive actuator 304 is implemented with a hydraulic ball screw. In some examples, the sensor 310 is implemented within the camber control actuator 308.

While the example of FIG. 3 is shown in conjunction with the wing 314, examples disclosed herein can be implemented with any appropriate aerodynamic structure including but not limited to ailerons, flaperons, rudders, elevators, etc. While the camber control system 300 is shown implemented on a fowler flap (e.g., a high fowler flap, a high angle follower flap, etc.) in this example, the camber control system 300 can be implemented on any appropriate aerodynamic surface and/or flap application. For example, the camber control system 300 can be implemented in conjunction with a slotted flap, a double-slotted flap, a split flap, a double-slotted flap, a junkers flap, a plain flap, etc.

Figure 4A:
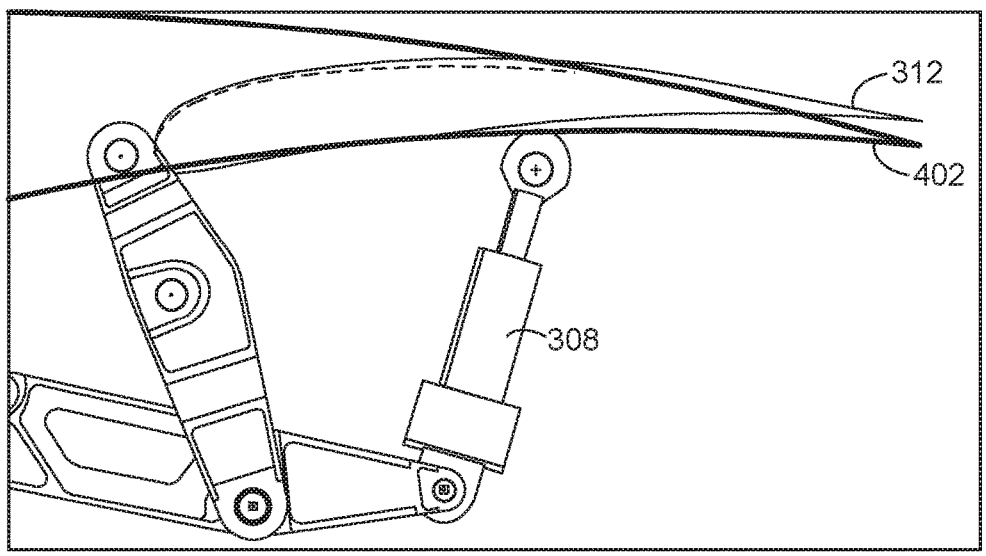
FIGS. 4A-4C illustrate example flap positions associated with the example camber control system of FIG. 3.
Figure 4B:
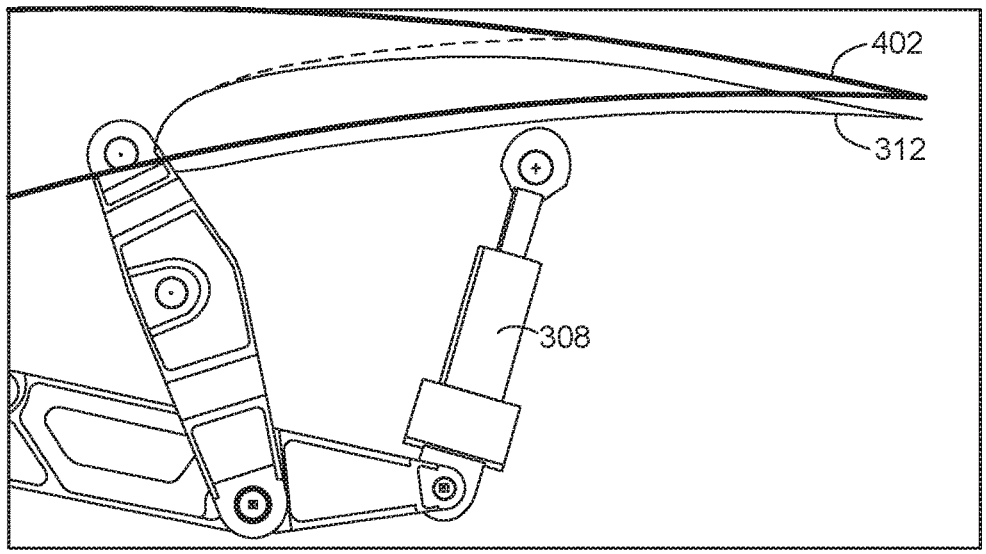
Figure 4C:
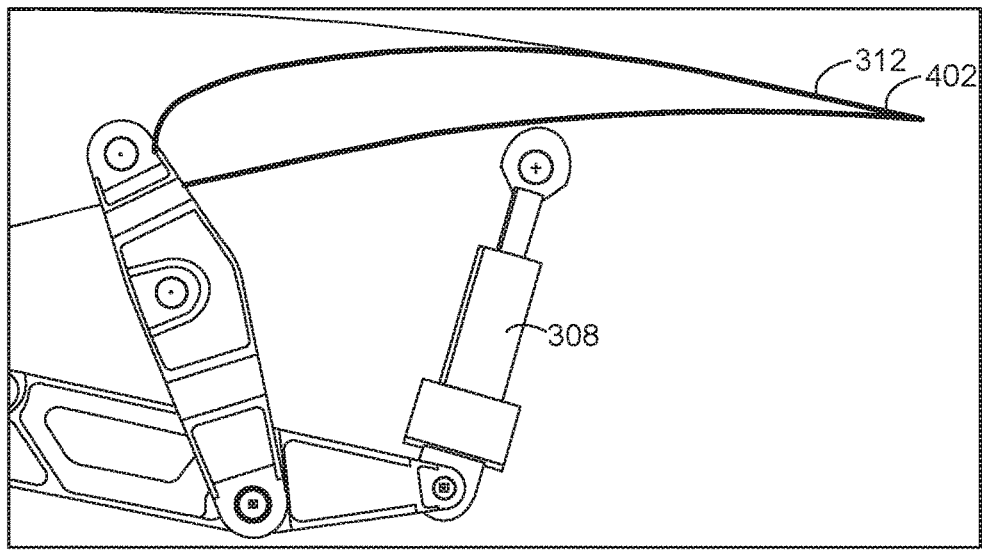

FIGS. 4A-4C illustrate example flap positions associated with the example camber control system of FIG. 3. Turning to FIG. 4A, the flap 312 is shown at a rotational angle upward (in the view of FIG. 4A) from a neutral position or orientation 402. In this view, the flap 312 has been rotated by an extension of the camber control actuator 308. However, the flap 312 is rotated away from the neutral position 402 (e.g., due to a lack of accuracy of the main drive actuator 304 or a force provided to the flap 312).

FIG. 4B shows the flap 312 in another position away from the neutral position 402. In particular, the example camber control actuator 308 has retracted to move the flap 312 along a downward direction (in the view of FIG. 4B) and caused the flap 312 to diverge away from the neutral position 402 in a direction opposite that shown in FIG. 4A.

Turning to FIG. 4C, the camber control actuator 308 has moved the flap 312 to align with the neutral position 402. In some examples, the camber control actuator 308 controls rotation of the flap 312 based on a measured position of the flap 312 (e.g., measured by the sensor 310 of FIG. 3). Additionally or alternatively, the camber control actuator 308 is continuously and/or periodically moving (e.g., in translation and/or rotation) the flap 312 to align with the neutral position 402 (e.g., during cruise of the aircraft 100).

Figure 5:
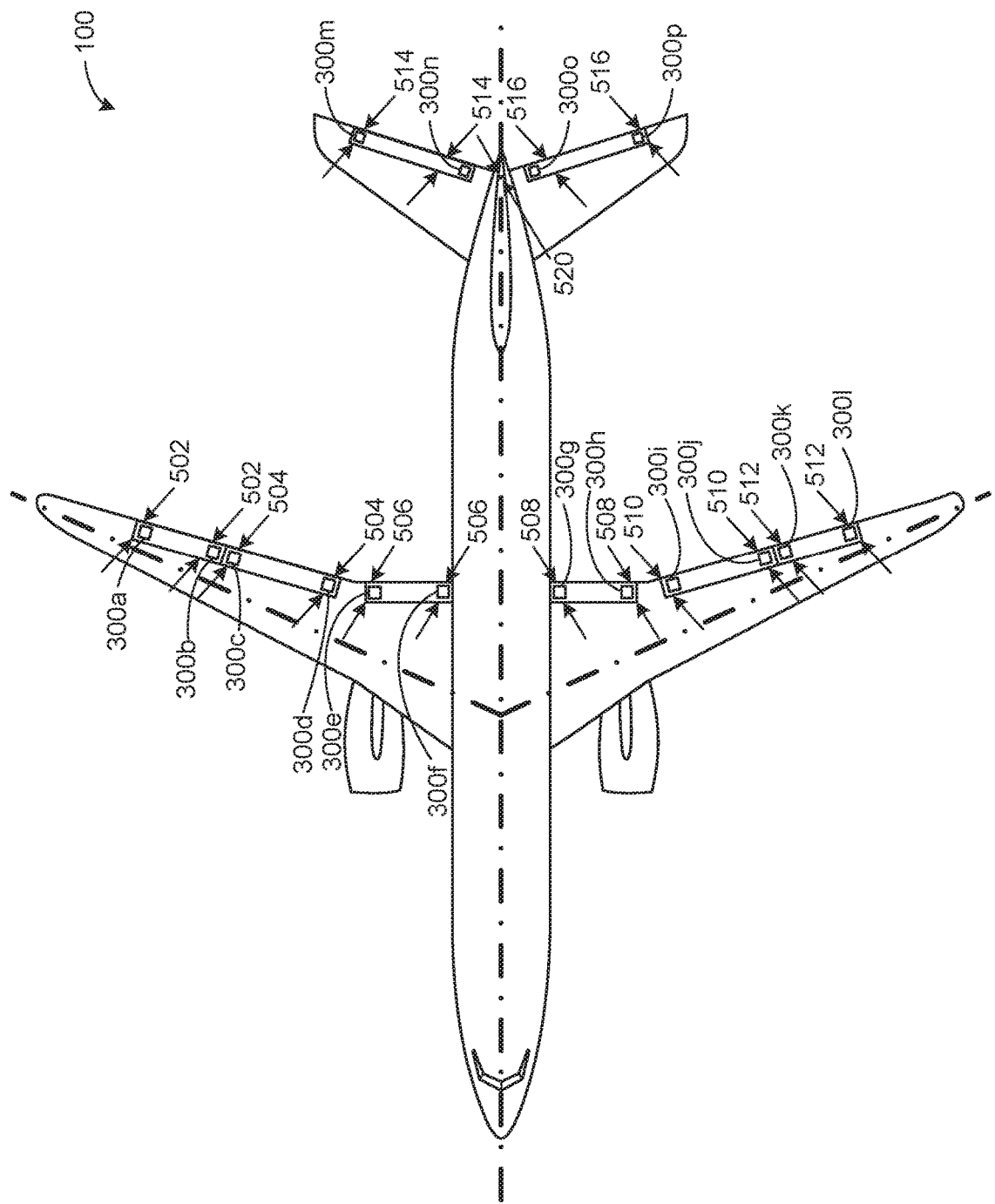
FIG. 5 illustrates spanwise control that may be implemented in examples disclosed herein.

FIG. 5 illustrates spanwise control (e.g., across a span of a flap) that may be implemented in examples disclosed herein. According to the illustrated example, multiple (i.e., two or more) camber control systems 300 (hereinafter 300a through 300p, etc.) can be implemented on the aerodynamic components of the wing 104 to vary camber along their respective lateral spans, thereby causing potential twist or height variations (e.g., a flap that is twisted based on varying rotational displacement). For example, As can be seen in the view of FIG. 5, camber variations along portions of the aircraft 100 are generally indicated by arrows 502, 504, 506, 508, 510, 512, 514, 516, 520 to affect a flight dynamic of the aircraft 100. In other words, camber at multiple points associated with the individual aerodynamic components are adjusted to control movement and/or orientation of the aircraft 100. In some examples, a first one of the camber control systems 300 is placed at approximately 25% of a respective lateral span and a second of the camber control systems 300 is placed at approximately 75% of the respective lateral span. Additionally or alternatively, cambers and/or associated twisting of the aerodynamic components are varied between different sides of the aircraft 100 (e.g., varied between left to right sides of the aircraft 100). In some examples, a continuous curvature of the corresponding aerodynamic component is defined based on multiple respective camber control systems 300.

Figure 6:
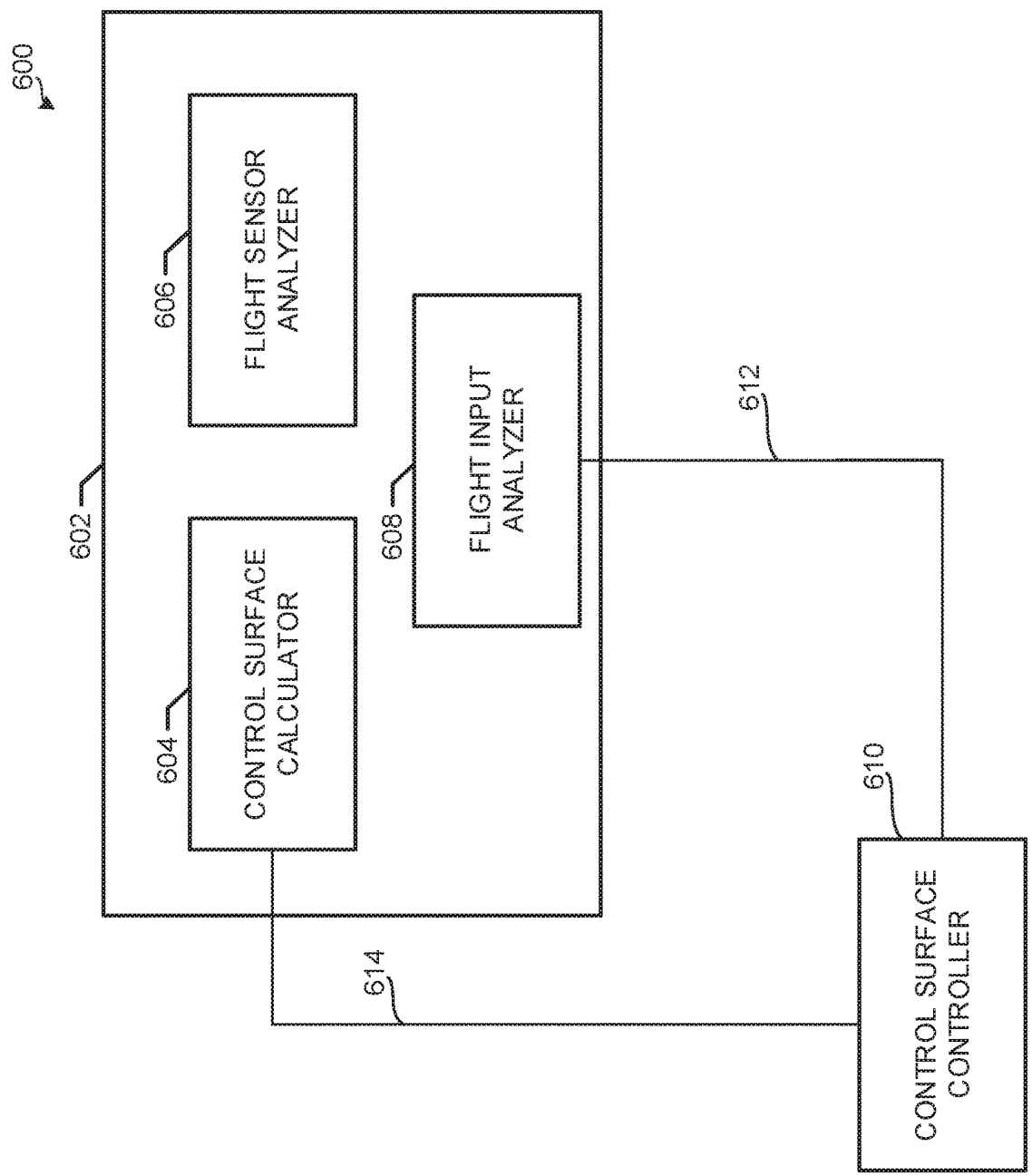
FIG. 6 is a schematic overview of an example camber calculation system that may be implemented in examples disclosed herein.

FIG. 6 is a schematic overview an example camber calculation system 600 that may be implemented in examples disclosed herein. The example camber calculation system 600 includes a camber analysis portion 602, which includes a control surface calculator 604, a flight sensor analyzer 606, and a flight input analyzer 608. In this example, the flight input analyzer 608 is communicatively coupled to a control surface controller 610 via a communication line 612. Further, the control surface calculator 604 is communicatively coupled to the control surface controller 610 via a communication line 614.

To determine a flight parameter and/or condition, the example flight sensor analyzer 606 interfaces with sensors (e.g., the sensor 310) and/or flight instrumentation to determine one or more flight conditions and/or parameters. The flight conditions and/or parameters can include speed, heading or trajectory information, drag coefficient, and/or air conditions, etc.

In some examples, the flight input analyzer 608 gathers and analyzes flight inputs and/or commands (e.g., navigation commands) from a flight input interface. In particular, the flight input analyzer 608 can receive cockpit commands pertaining to desired movement of the aircraft 100. Additionally or alternatively, the flight input analyzer 608 and/or the control surface calculator 604 determine component-wise cambers as shown in connection with arrows 502, 504, 506, 508, 510, 512, 514, 516, 520 of FIG. 5 to vary a movement and/or operational condition of the aircraft 100.

According to the illustrated example, the control surface calculator 604 determines an adjustment of a control surface, such as the flap 312. In this example, the control surface calculator 604 calculates a desired adjustment angle of the flap 312 based on a flight parameter, a flight condition and/or received flight commands. Additionally or alternatively, a camber associated with the wing 314 is adjusted based on a positional measurement of the flap 312 relative to the wing 314 (e.g., a measurement determined by the sensor 310). In particular, a translational and/or angular deviation that is measured by the sensor 310 can be adjusted by the control surface calculator 604 (e.g., to reduce a drag coefficient and/or unintended trajectory deviation). In other examples, the control surface calculator 604 determines an adjustment camber to reduce (e.g., minimize) a drag coefficient of the aircraft 100.

The example control surface controller 610 directs movement of the main drive actuator 304 and/or the camber control actuator 308. In some examples, the control surface controller 610 moves both the main drive actuator 304 and the camber control actuator 308 in a coordinated manner for a desired flight operation and/or to move the flap 312 towards the flap seal 336. In some examples, the control surface controller 610 prevents or restricts motion of the main drive actuator 304 while the camber control actuator 308 is operated to adjust a camber of the wing 314 and/or the flap 312.

While an example manner of implementing the camber calculation system 600 of FIG. 6 is illustrated in FIG. 6, one or more of the elements, processes and/or devices illustrated in FIG. 6 may be combined, divided, re-arranged, omitted, eliminated and/or implemented in any other way. Further, the example control surface calculator 604, the example flight sensor analyzer 606, the example flight input analyzer 608, the example control surface controller 610 and/or, more generally, the example camber calculation system 600 of FIG. 6 may be implemented by hardware, software, firmware and/or any combination of hardware, software and/or firmware. Thus, for example, any of the example control surface calculator 604, the example flight sensor analyzer 606, the example flight input analyzer 608, the example control surface controller 610 and/or, more generally, the example camber calculation system 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, control surface calculator 604, the example flight sensor analyzer 606, the example flight input analyzer 608, and/or the example control surface controller 610 is/are hereby expressly defined to include a non-transitory computer readable storage device or storage disk such as a memory, a digital versatile disk (DVD), a compact disk (CD), a Blu-ray disk, etc. including the software and/or firmware. Further still, the example camber calculation system 600 of FIG. 6 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
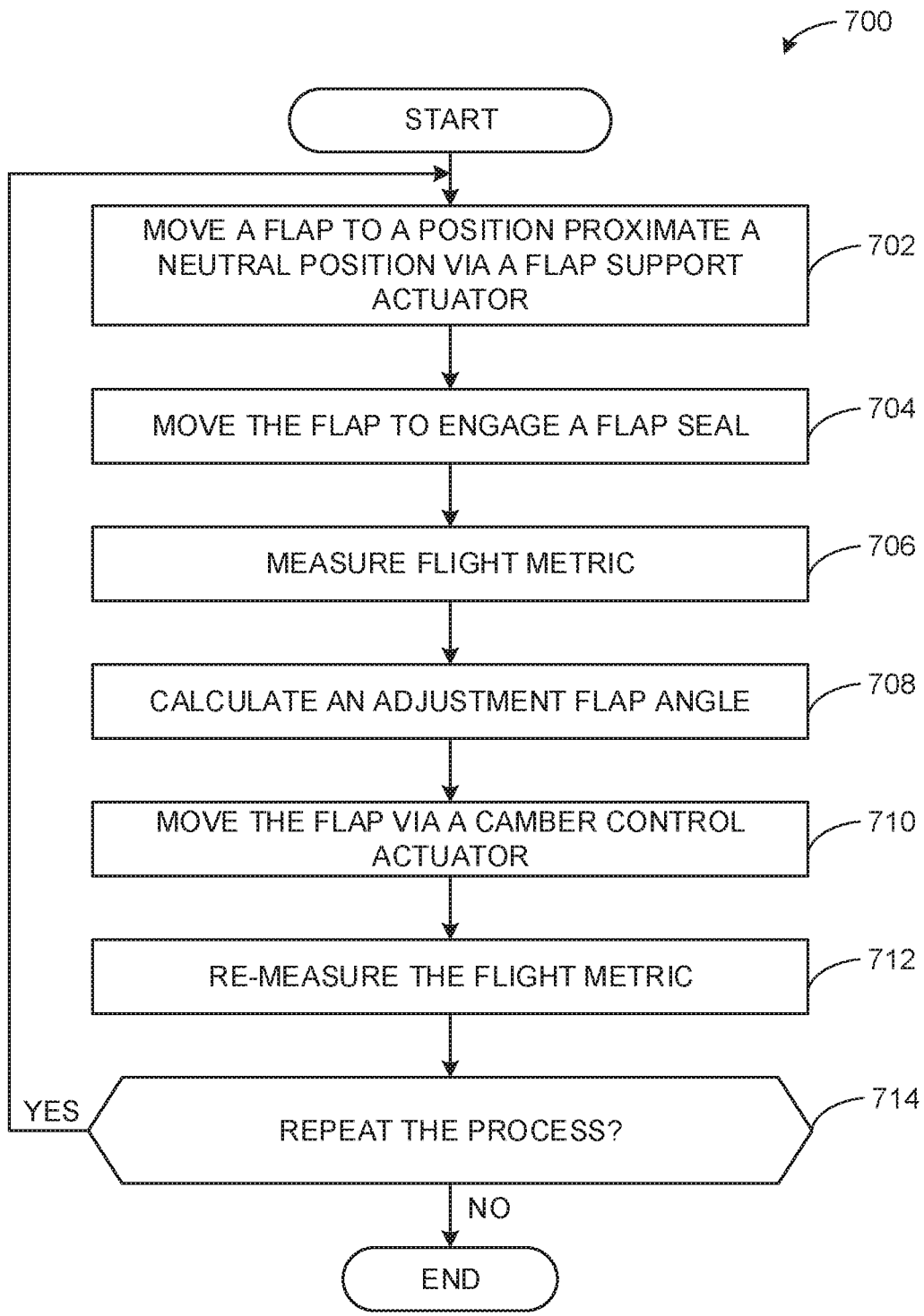
FIG. 7 is a flowchart representative of machine readable instructions which may be executed to implement the camber calculation system of FIG. 6.

A flowchart representative of example hardware logic or machine readable instructions for implementing the camber calculation system 600 of FIG. 6 is shown in FIG. 7. The machine readable instructions may be a program or portion of a program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example camber calculation system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The example method 700 of FIG. 7 begins as the flap 312 is to be moved to adjust a camber associated with the wing 314 to reduce an overall drag coefficient of the aircraft 100 during cruise. In this example, the aircraft 100 has moved into cruise speed and altitude prior to the camber being adjusted by the camber control actuator 308.

In this example, the flap 312 is moved to a position proximate its neutral position by the main drive actuator 304 (block 702). In other words, the main drive actuator 304 moves the flap 312 near to its respective neutral position. In some other examples, the main drive actuator 304 moves the flap 312 to its neutral position. However in these examples, subsequent forces (e.g., air resistance forces, etc.) may act upon the flap 312, thereby causing the flap 312 to move away from the neutral position.

In some examples, the control surface calculator 604 and/or the control surface calculator cause the camber control actuator 308 to move the flap 312 towards the flap seal 336 so that the flap 312 engages the flap seal 336 (block 704).

In some examples, a flight metric (e.g., a flight parameter) is measured (block 706). In such examples, the flight sensor analyzer 606 receives sensor data (e.g., from the sensor 310) pertaining to flight parameters and/or conditions of the aircraft 100. Additionally or alternatively, flight sensor analyzer 606 analyzes sensor data to calculate and/or determine the flight metric.

According to the illustrated example, the control surface calculator 604 calculates an adjustment flap angle of the flap 312 (block 708). In some examples, the control surface calculator makes this calculation based on a calculated or determined deviation of the flap 312 from a respective neutral position. Additionally or alternatively, determination of a movement of the flap 312 away from the wing 314 (e.g., translational or rotational separation of the flap 312 away from the wing 314 and the flap seal 336 during cruise) is used to calculate or determine the adjustment flap angle. In other examples, the adjustment flap angle is calculated for a reduction of drag coefficient.

The example control surface controller 610 causes the camber control actuator 308 to move the flap 312 to adjust a translation and/or a rotation of the flap 312 (block 710).

In some examples, the flight metric is re-measured (block 712). In such examples, sensor data and/or calculations may be used to determine the flight metric. The flight metric can be drag coefficient, for example.

It is then determined whether to repeat the process (block 714). If the process is to be repeated, control of the process returns to block 702. Otherwise, the process ends. This determination may be based on the flight metric reaching an acceptable level (e.g., relative to a threshold metric) and/or convergence of the flight metric (e.g., convergence of the flight metrics between adjustments of the flap 312).

Figure 8:
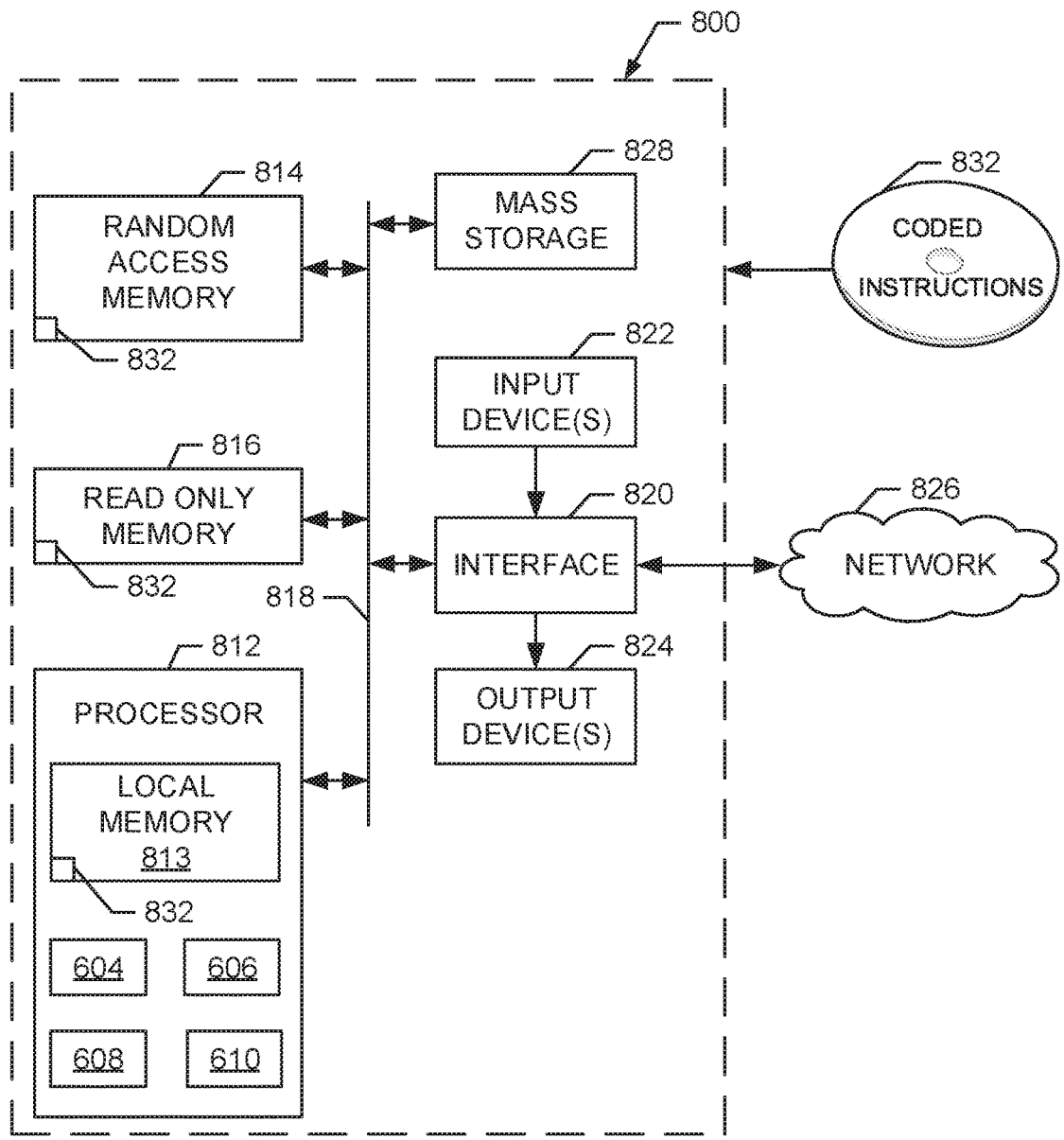
FIG. 8 is a block diagram of an example processing platform structured to execute the instructions of FIG. 7 to implement the camber calculation system of FIG. 6.

FIG. 8 is a block diagram of an example processor platform 800 structured to execute the instructions of FIG. 7 to implement the camber calculation system 600 of FIG. 6. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example control surface calculator 604, the example flight sensor analyzer 606, the example flight input analyzer 608 and the example control surface controller 610.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable accurate control of flaps, such as high fowler flaps and/or high angle rotational flaps, thereby allowing effective and accurate TEVC control for aerodynamic advantages. Examples disclosed herein can be implemented to maintain and/or adjust a position of a flap to lower an overall drag coefficient and/or maintain a seal of a flap against a respective flap seal for improved aerodynamic operation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown related to aircraft, examples disclosed herein can be applied to other appropriate vehicles and/or aerodynamic application(s), such as windmills, watercraft, etc.

What is claimed is:

1. An apparatus comprising:
   a flap support to be coupled to a flap of an aircraft, the flap rotatable relative to an aerodynamic surface;
   a drive arm linkage rotatably coupled to the flap support at a first pivot of the flap support, the drive arm linkage having a second pivot at an end opposite the first pivot;
   a flap support actuator operatively coupled to the flap support, the flap support actuator to rotate the drive arm linkage; and
   a camber control actuator rotatably coupled to the flap support at a third pivot of the flap support, the camber control actuator to be rotatably coupled to the flap at a fourth pivot.

2. The apparatus as defined in claim 1, further including a flap seal, wherein the camber control actuator is to maintain the flap in contact with the flap seal.

3. The apparatus as defined in claim 1, further including a controller to control the camber control actuator during a cruise flight stage of the aircraft to vary a camber associated with the aerodynamic surface.

4. The apparatus as defined in claim 1, wherein the camber control actuator is a variable length actuator.

5. The apparatus as defined in claim 1, wherein the flap is a high fowler flap.

6. The apparatus as defined in claim 1, wherein the second pivot is disposed at a distal end of the flap support.

7. The apparatus as defined in claim 1, wherein the third pivot is disposed at approximately 25% to 75% of a chord length of the flap.

8. The apparatus as defined in claim 1, wherein the aerodynamic surface is defined by a wing of the aircraft.

9. A method comprising:
   rotating, via a flap support actuator, a drive arm linkage to move a flap of an aircraft relative to a neutral position associated with an aerodynamic surface, wherein the drive arm linkage is rotatably coupled to a flap support at a first pivot of the flap support, and wherein the drive arm linkage includes a second pivot at an end opposite the first pivot; and
   moving, via a camber control actuator, the flap to adjust an angle of the flap, wherein the camber control actuator is rotatably coupled to a third pivot of the flap support and a fourth pivot associated with the flap.

10. The method as defined in claim 9, further including:
    measuring a flight parameter of the aircraft during a cruise flight stage;
    calculating an adjustment angle based on the flight parameter; and
    adjusting, via the camber control actuator, the angle of the flap to rotate the flap based on the adjustment angle.

11. The method as defined in claim 10, wherein measuring the flight parameter includes measuring the angle of the flap.

12. The method as defined in claim 9, further including adjusting a second angle of the flap at a second camber control actuator to cause a twist across a span of the flap.

13. The method as defined in claim 9, wherein moving the flap includes moving the flap towards a flap seal to contact the flap seal.

14. The method as defined in claim 9, further including restricting, via the flap support actuator, rotational motion of the flap when the camber control actuator moves the flap.

15. The method as defined in claim 9, wherein adjusting the flap via the camber control actuator includes varying a length of the camber control actuator.

16. A tangible machine readable medium comprising instructions, which when executed, cause a processor to at least:
    determine that a flap of an aircraft has been rotated, via a flap support actuator, relative to a neutral position associated with an aerodynamic surface, wherein the flap support actuator moves a drive arm linkage that is rotatably coupled to a flap support at a first pivot of the flap support, and wherein the drive arm linkage includes a second pivot at an end opposite the first pivot;
    determine a flight parameter of the aircraft during a cruise flight stage of the aircraft;
    calculate an adjustment flap angle based on the flight parameter; and
    control movement of a camber control actuator based on the adjustment flap angle to adjust an angle of the flap, wherein the camber control actuator is rotatably coupled to a third pivot of the flap support and a fourth pivot associated with the flap.

17. The tangible machine readable medium as defined in claim 16, wherein the processor is further caused to direct the camber control actuator to move the flap to engage a flap seal.

18. The tangible machine readable medium as defined in claim 16, wherein the processor is further caused to direct the flap support actuator to restrict rotational motion of the flap while the camber control actuator controls movement of the flap.

19. The tangible machine readable medium as defined in claim 16, wherein calculation of the adjustment flap angle includes calculating an adjustment length of the camber control actuator.

20. The tangible machine readable medium as defined in claim 16, wherein determination of the flight parameter includes measurement of the angle of the flap.

* * * * *